United States Patent
Woo et al.

(10) Patent No.: US 6,850,490 B1
(45) Date of Patent: Feb. 1, 2005

(54) HIERARCHICAL OUTPUT-QUEUED PACKET-BUFFERING SYSTEM AND METHOD

(75) Inventors: Leon K. Woo, Concord, MA (US); Robert Ryan, Marlboro, MA (US)

(73) Assignee: Enterasys Networks, Inc., Andover, MA (US)

( * ) Notice: Subject to any disclaimer, the term of this patent is extended or adjusted under 35 U.S.C. 154(b) by 707 days.

(21) Appl. No.: 09/684,763

(22) Filed: Oct. 6, 2000

Related U.S. Application Data

(60) Provisional application No. 60/157,925, filed on Oct. 6, 1999.

(51) Int. Cl.[7] ................................................ H04J 1/16
(52) U.S. Cl. ...................................... 370/230; 370/412
(58) Field of Search .............................. 370/230, 230.1, 370/412, 413, 415, 417, 468

(56) References Cited

U.S. PATENT DOCUMENTS

| | | | | |
|---|---|---|---|---|
| 5,440,523 A | | 8/1995 | Joffe ...................... | 365/230.05 |
| 5,742,606 A | * | 4/1998 | Iliadis et al. ................. | 370/413 |
| 5,831,980 A | * | 11/1998 | Varma et al. .......... | 370/395.72 |
| 6,072,772 A | * | 6/2000 | Charny et al. .............. | 370/229 |
| 6,088,734 A | * | 7/2000 | Marin et al. ................. | 709/232 |
| 6,229,812 B1 | * | 5/2001 | Parruck et al. ............. | 370/412 |
| 6,333,917 B1 | * | 12/2001 | Lyon et al. .................. | 370/236 |
| 6,553,035 B1 | * | 4/2003 | Schwartz et al. ........... | 370/412 |
| 6,570,876 B1 | * | 5/2003 | Aimoto ....................... | 370/389 |
| 6,643,260 B1 | * | 11/2003 | Kloth et al. ................ | 370/235 |
| 2002/0054568 A1 | * | 5/2002 | Hoogenboom et al. .. | 370/235.1 |
| 2002/0075882 A1 | * | 6/2002 | Donis et al. ................. | 370/412 |

FOREIGN PATENT DOCUMENTS

DE         19617816 A1      11/1997

OTHER PUBLICATIONS

Woodworth et al., "A Flexible Broadband Packet Switch for a Multimedia Integrated Network", Copyright IEEE 1991, pp. 78–85.

* cited by examiner

Primary Examiner—Chau Nguyen
Assistant Examiner—Christine Ng
(74) Attorney, Agent, or Firm—Lowrie, Lando & Anastasi, LLP

(57) ABSTRACT

The packet-buffering system and method of the present invention enables communication devices incorporating a full-mesh architecture to achieve bandwidth aggregation levels ordinarily associated with partial-mesh architectures. The packet-buffering invention uses a hierarchical memory structure having first and second packet-buffers to buffer packets between the input and output ports of the communication device. The received packets are organized by output port and priority level in the first packet buffer, which operates at the aggregate network rate of the communication device. The packets are then funneled to second packet buffers, having corresponding priority and output port assignments, at less than the aggregate network rate and which exhibit buffer depths that exceed that of the first packet buffer. The resulting hierarchical output-queued, packet-buffering system enables a communication system that exhibits a high degree of differentiated services with bandwidth guarantees and at high aggregation levels without experiencing head-of-line blocking.

92 Claims, 11 Drawing Sheets

HIERARCHICAL OUTPUT-QUEUED PACKET-BUFFERING SYSTEM AND METHOD

CROSS-REFERENCE TO RELATED APPLICATION

This claims priority to and the benefit of U.S. provisional patent application No. 60/157,925, filed Oct. 6, 1999.

FIELD OF THE INVENTION

The present invention relates generally to communication systems, and in particular to movement of data flows in packet-based communication architectures.

BACKGROUND OF THE INVENTION

Data communication involves the exchange of data between two or more entities interconnected by communication links. The data can be, for example, information transferred among computers or voice transmissions between individuals. In packet-based systems, data is communicated as discrete packets or frames of data according to predefined protocols; the protocols define how the packets are constructed and treated as they travel from source to destination, and facilitate re-assembly of the original message from the packets.

The rapid proliferation of Internet communication, as well as rising demand for traditional telecommunication services, have taxed the ability of carriers to handle the resulting escalation in traffic. Carriers have increasingly turned to fiber-optic media, which offer large information-carrying capacity (bandwidth) at high speeds with substantial reliability. Bandwidth is further increased by "multiplexing" strategies, which allow multiple data streams to be sent over the same communication medium without interfering with each other. For example, time-division multiplexing (TDM) allows packets from a particular flow to be transmitted only within a "time slot," i.e., a short window of availability recurring at fixed intervals (with other time slots scheduled during the intervals). Each time slot represents a separate communication channel. These time slots are then multiplexed onto higher speed lines in a predefined bandwidth hierarchy. In dense wavelength division multiplexing (DWDM), the channels are different wavelengths of light, which may be carried simultaneously over the same fiber without interference and effectively multiplying the capacity of the fiber by the number of wavelengths of light.

These strategies have allowed telecommunication media to accommodate large increases in traffic. The task of routing the traffic, i.e., directing different data flows to their destinations, is made more difficult by this large increase in traffic. Packets may traverse numerous communication networks and subnetworks before reaching an end station. Moreover, networks are designed to balance traffic across different branches as well as to other networks, so that different packet flows may travel over different paths to their common destination. Packet routing is handled by communication devices such as switches, routers, and bridges.

For example and with reference to FIG. 1, a communication device 150 receives information (in the form of packets/frames, cells, or TDM frames) from a communication network 110 via a communication link 112 and transfers the received information to a different communication network or branch such as a Local Area Network (LAN) 120, Metropolitan Area Network (MAN) 130, or Wide Area Network (WAN) 140. The communication device 150 can contain a number of network interface cards (NICs), such as NIC 160 and NIC 180, each having a series of input ports (e.g., 162, 164, and 166) and output ports (e.g., 168, 170, and 172). Input ports 162, 164, and 166 receive information from the communication network 110 and transfer them to a number of packet processing engines (not shown) that process the packets and prepare them for transmission at one of the output ports 168, 170, and 172, which correspond to a communication network such as the LAN 120, MAN 130, or WAN 140 containing the end station.

Even in well-run networks, some congestion is inevitable. This may be due to data traffic temporarily overwhelming a particular network branch, but more often arises from demands placed on the communication device itself—for example, a particular output port may become backlogged when data is accumulated faster than it can be sent. An ideal communication device would be capable of aggregating incoming data from numerous input channels and outputting that data on the proper port without any delay. Unfortunately, not only is this ideal unrealistic as data travel rates continue to increase, but the twin goals of high data aggregation and backlog minimization have been largely antithetical.

Historically, communication systems that emphasized minimal backlog minimal congestion (i.e., high quality of service, or QoS) utilized a "full-mesh interconnect" configuration as shown in FIG. 2A. In accordance with this configuration, a switch 200 includes a series of p input ports denoted as $IN_1 \ldots IN_p$ and a series of p output ports denoted as $OUT_1 \ldots OUT_p$. A typical switch is configured to accommodate multiple plug-in network interface cards, with each card carrying a fixed number of input and output ports.

In the full-mesh system, each input port is directly connected to every output port; as a result, packets can travel between ports with minimal delay. An incoming packet is examined to determine the proper output port and is routed thereto. Full-mesh switches can also be used to implement an output-buffered architecture that can accommodate rich QoS mechanisms; for example, some customers may pay higher fees for better service guarantees, and different kinds of traffic may be accorded different priorities. Distributed schedulers 210 associated with each output port output the packets in accordance with the priority levels associated with their respective queues. As shown in FIG. 2A, for example, a series of n priority queues $205_1, 205_2 \ldots 205_n$ is associated with output port $OUT_1$, and a distributed scheduler module 210 selects packets from these queues from transmission in accordance with their queue-level priorities.

Output-buffering allows pure priority scheduling in addition to more advanced QoS mechanisms such as proportional fairness, data shaping, and re-allocation of traffic from idle queues to busy queues (to eliminate trapped bandwidth). Proportional fairness recognizes that packet size can vary, so that if prioritization were applied strictly on a per-packet basis, larger packets would have an inappropriate advantage and could cause excessive jitter. Data shaping regulates the average rate and concentration of data transfer—that is, the traffic pattern. Limitations on traffic patterns are imposed in order to moderate burstiness and avoid excessive data congestion without undue burden on any particular data flow.

Despite its QoS advantages, full-mesh architectures did not historically scale as well as partial-mesh architectures. The interconnection complexity not only reduces performance at high data-transfer rates, but can be unrealizable beyond a certain number of ports. "Partial-mesh" designs were therefore developed to permit higher degrees of data aggregation. A switch 250 based on a partial-mesh design is depicted in FIG. 2B. The switch 250 also contains a series of p input ports and a complementary series of p output ports. In this case, however, each input port is not fully connected at all times to every output port. Instead, a central scheduling module 255 connects input ports to output ports on an as-need basis.

By virtue of its reduced connection structure, partial-mesh architectures support high aggregate bandwidths, but will block, or congest, when certain traffic patterns appear at the inputs. For example, packet flows from several input ports may require access to a particular output port at the same time. Since the packets will have been queued to the input port in the order received, the result is "head-of-line" blocking in which higher-priority traffic is blocked by lower-priority traffic thus preventing fulfillment of bandwidth and QoS guarantees.

These blocking scenarios have been alleviated in partial-mesh systems through the use of "virtual output queuing" at the input side; that is, output queues located at the input ports rather than the output ports. As shown in FIG. 2C, associated with input port $IN_1$ are a series of p×q output queues 260, organized as p sets of q queues—that is, q priority queues for each output port 1 through p. In this way, incoming packets can be prioritized before they have a chance to cause head-of-line blocking.

Because of the replication of queues, queue efficiency (that is, the utilization of memory space) is sacrificed. Moreover, sophisticated de-queuing schemes for scheduling the output of packets from the many queues can be difficult or impossible to implement; this is due to the multiplicity of output queues and their functional proximity to the input ports rather than the output ports (so that output decisions are based not on the actual state of an output port but on an assumed state, which may be inaccurate). As a result, the de-queuing scheme must ordinarily be rudimentary and global in nature; that is, the policy implemented by scheduler 255 cannot be specific to the queues. As a practical matter, pure priority is generally the only QoS mechanism amenable to system-wide application. The output-side controls (proportional fairness, etc.) discussed above therefore cannot readily be implemented on a system using virtual output queuing.

DESCRIPTION OF THE INVENTION

Brief Summary of the Invention

The present invention utilizes a hierarchically organized output-queuing system that permits scaling of full-mesh architectures to bandwidth aggregation levels ordinarily associated with partial-mesh systems. Moreover, the architecture of the present invention facilitates output-side traffic engineering control, thereby accommodating sophisticated de-queuing schemes that respect packet priority levels.

In one embodiment, a packet-buffering system and method incorporating aspects of the present invention is used in transferring packets from a series of input ports to a series of output ports in a communication device that is coupled to a communications network. The system buffers the packets received over the communications network in a hierarchical packet-buffering architecture, comprising two or more levels of memory/packet buffers rather than in a single memory as in the prior art.

A first packet buffer is organized into a first series of queues. The first-series queues can also be further grouped into sets of queues corresponding to the priority levels associated with the packets received over the communications network at the input ports of the communication device. Each first-series priority queue set is also associated with one of the output ports of the communication device. Similarly, a second packet buffer (and, if desired, additional packet buffers) is also organized into a series of queues that can be grouped into priority queue sets associated with particular output ports of the communication device.

The first packet buffer receives packets from the input ports of the communication device at the aggregate network rate (i.e., the overall transmission rate of the network itself). The received packets are then examined by an address lookup engine to ascertain their forwarding properties, e.g., the destination output ports desired, their priority level based on QoS, etc. Once the output port and priority level associated with the packets are known, the packets are transferred at the aggregate network rate to first-series queues having priority levels consistent with the priority levels of the received packets, and which are also associated with the designated output port.

The packets in these first-series queues are subsequently transferred to corresponding second-series queues at a rate less than the aggregate network rate. These second-series queues are part of the second-series priority queue set whose priorities are consistent with those of the received packets and which are also associated with the designated output ports. The order in which the packets are transferred from the first-series queues to the second-series queues is based on the priority level of the packets, such that higher priority packets are transferred before lower priority packets. Once the packets have been received at the appropriate second packet buffer, any of various dequeuing systems associated with that second packet buffer, together with a scheduler, may schedule and transfer the packets to the designated output ports. Alternatively (and as discussed below), the packets may be transferred to additional, similarly organized packet buffers before reaching the output ports.

Where the first packet buffer receives and handles packets at the aggregate network rate, the type of memory selected for use as the first packet buffer should have performance characteristics that include relatively fast access times (e.g., embedded ASIC packet buffers, SRAMs). In order to accommodate this rate, the first-series queues have a relatively shallow queue size (i.e., buffer depth) and the sum of the bandwidths of the first-series queues is not less than the aggregate bandwidth of the communications network coupled to the input ports. As used in this context, the term "bandwidth" means the speed at which the queues can absorb network traffic without dropping any traffic.

The second packet buffer is able to receive packets from the first packet buffer at less than the aggregate network rate, and the queue depth of the second-series queues is typically larger than the queue depth of the first series queues. Consequently, the performance characteristics of the memory forming the second packet buffer does not require access times as fast as those of the first packet buffer (e.g., field-configurable memory elements such as DRAM, SDRAM, RAMBUS, High Density SRAMs, etc.). A sum of the bandwidths of the second packet buffers is equal to or greater than a sum of the first packet-buffer bandwidths, although the individual second packet buffer bandwidths are less than the aggregate first buffer bandwidth. The relaxation in performance requirements between the first and second packet buffers, without a corresponding loss in system performance, enables the use of less expensive memory for the second packet buffers.

In another embodiment of the present invention, the memory types used for the first and second packet buffers can exhibit substantially similar performance characteristics. For example, a homogeneous memory can be organized to accommodate both first-series and second-series queues by providing a shallow buffer depth for the first-series queues relative to that of the second-series queues.

Although the present invention has been and will continue to be discussed in the context of two levels of hierarchical memory, those skilled in the art will recognize that any number of levels can be implemented. For example, the present invention can accommodate a third packet buffer coupled to and receiving packets from at least one of the second packet buffers for subsequent transfer to a designated output port. This third packet buffer would also be comprised of third-series queues grouped as third-series priority queue sets so that third-series queues with a consistent priority level handle the appropriate packet priority levels. The sum of the third packet-buffer bandwidths would generally be equal to or greater than that of the corresponding second packet-buffer bandwidths and the sum of third packet-buffer depths would generally exceed the sum of the second packet-buffer depths.

Further, as the number of input ports in the communication device increases, a queue explosion can result at the first level, such that aggregation of the packets at a level above the first level is warranted. For example, packets may be aggregated into queue flows with a particular QoS (or in accordance with other forwarding attributes) in a level-zero packet buffer and subsequently funneling these queue flows through the lower levels of memory in the hierarchical memory architecture described above.

In summary, the hierarchical memory architecture of the present invention overcomes the scaling problems of traditional output-queued systems, because it allows the implementation of a high aggregate bandwidth packet-buffering memory that is comprised of an extremely high speed, relatively shallow memory system supplemented by the depth (and increased QoS capability) of a lower performance, lower cost memory system.

The benefits of the present invention not only include enhancing the scalability of full-mesh systems (output-queued) while avoiding head of line blocking, but they are also beneficial in partial-mesh systems. In essence, a plurality of full-mesh interconnected, hierarchical output-queued packet-buffering systems can be interconnected by a partial-mesh interconnect and still preserve many of the QoS features of the singular system.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 3A:
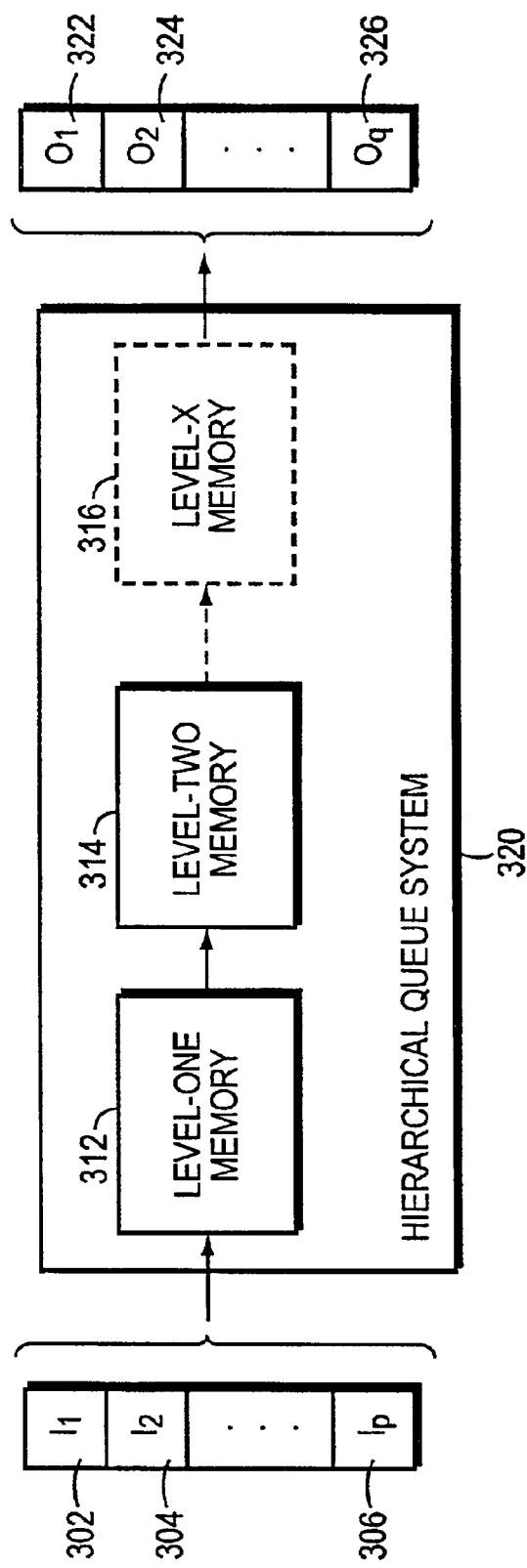
FIG. 3A schematically illustrates a hierarchical queue system in accordance with an embodiment of the present invention.

With reference to FIG. 3A, the present invention incorporates a hierarchical queue system 320 to transfer packets received over the communication network 110 from a plurality of input ports 302, 304, 306 to a plurality of output ports 322, 324, 326. The hierarchical queue system 320 buffers the received packets in a plurality of memory elements, such as a level-one memory 312, a level-two memory 314, and a level-X memory 316.

Figure 1:
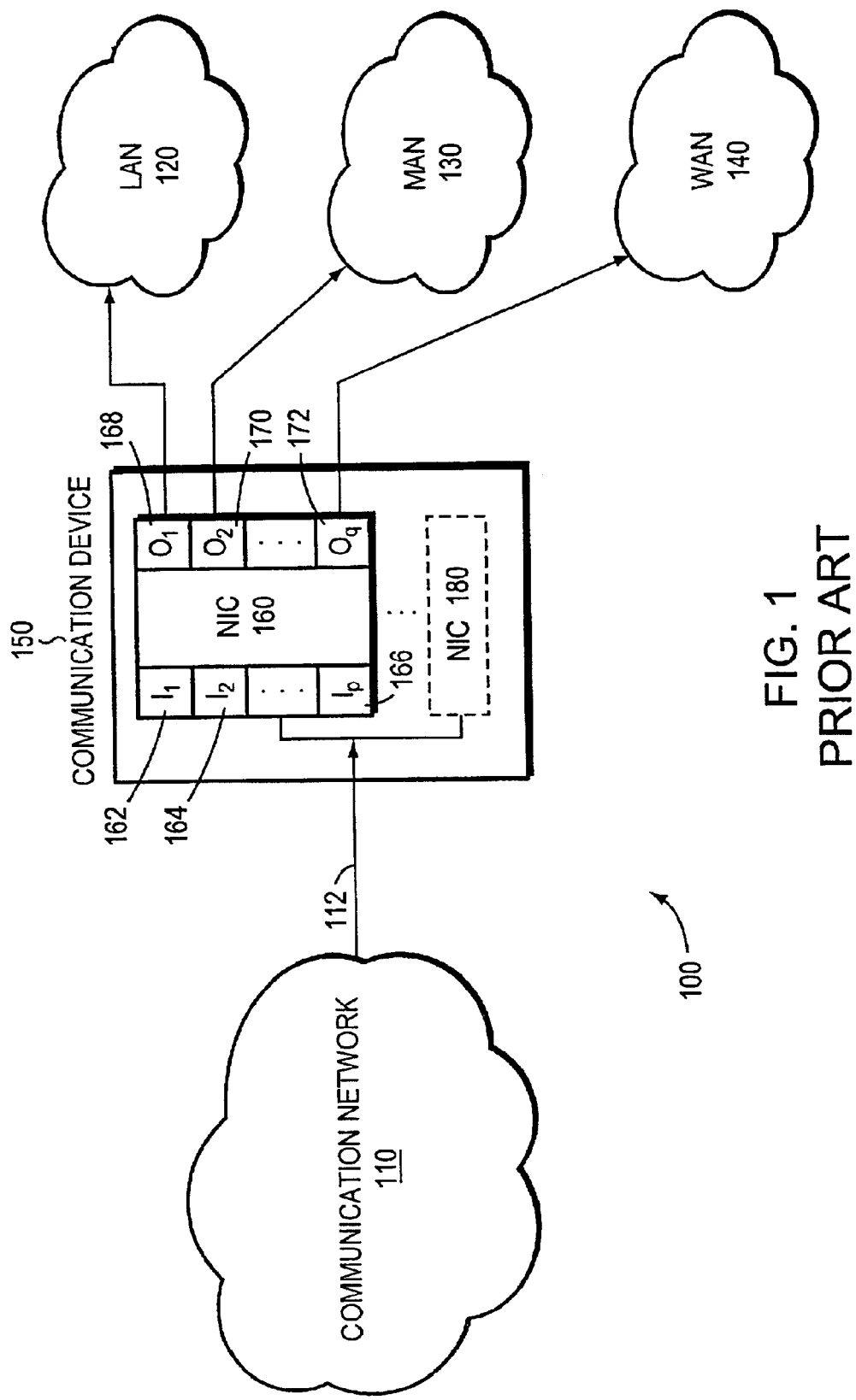
FIG. 1 schematically illustrates a prior-art communication device coupling a communication network to other networks, such as LANs, MANs, and WANs.

In order to absorb the aggregate network rate of the communication device 150 (FIG. 1) the level-one memory 312 must be fast enough to buffer at line rate the aggregate traffic of all input ports 302, 304, 306 without loss. Level-one memory can be typically constructed of "wide" memories, where the memory width is defined as the number of bits that can be stored in parallel in the memory in one clock cycle. However, the memory clock rate is limited by the capabilities of the technology of the day. At a given technology-limited clock rate, memory bandwidth can be increased by making the memory width wider. But because the memory storage density is also limited by the technology of the day, making the memories wider necessitates that they become shallower. The resulting reduction in memory depth can be recovered by adding a plurality of level-two memories 314, 316 whose aggregate bandwidth is equal to or greater than the bandwidth of the level-one memory 312. Although the ability to support a particular packet-buffer bandwidth without sacrificing packet-buffer depth for a given network environment may be achieved as memory technology improves, the problem resurfaces when trying to scale the communication device 150 at even higher packet-buffer bandwidths.

In order to facilitate scaling without unrealistic increases in memory performance, the hierarchical queue system 320 incorporates memory levels 314, 316 that are organized according to successively deeper packet-buffer depths (i.e., capable of storing more bytes) and that exhibit packet-buffer bandwidths equal to or greater than that of the level-one memory 312, in aggregate. The level-two memory 314 and level-X memory 316 essentially make up for the sacrifice in packet-buffer depth in the level-one memory 312 through organization into deeper packet-buffer depths. Although the type of memory used in each memory level 312, 314, 316 of the hierarchical queue system 320 can exhibit substantially similar performance characteristics (while being organized differently), the offsetting effects of the level-two memory 314 and level-X memory 316 allow the use of denser memory types (i.e., greater packet-buffer depth) for the lower level memories 314, 316 that can result in significant cost savings.

The present invention will hereafter be described as being implemented in a network interface card of a communication device, however this particular implementation is merely an illustrative embodiment and those skilled in the art will recognize any number of other embodiments that can benefit from the claimed invention. For example, the hierarchical queue system 320 of the present invention can be implemented in a wide variety of communication devices (e.g., switches and routers), in a shared memory accessible to one or more communication devices, etc.

Figure 2A:
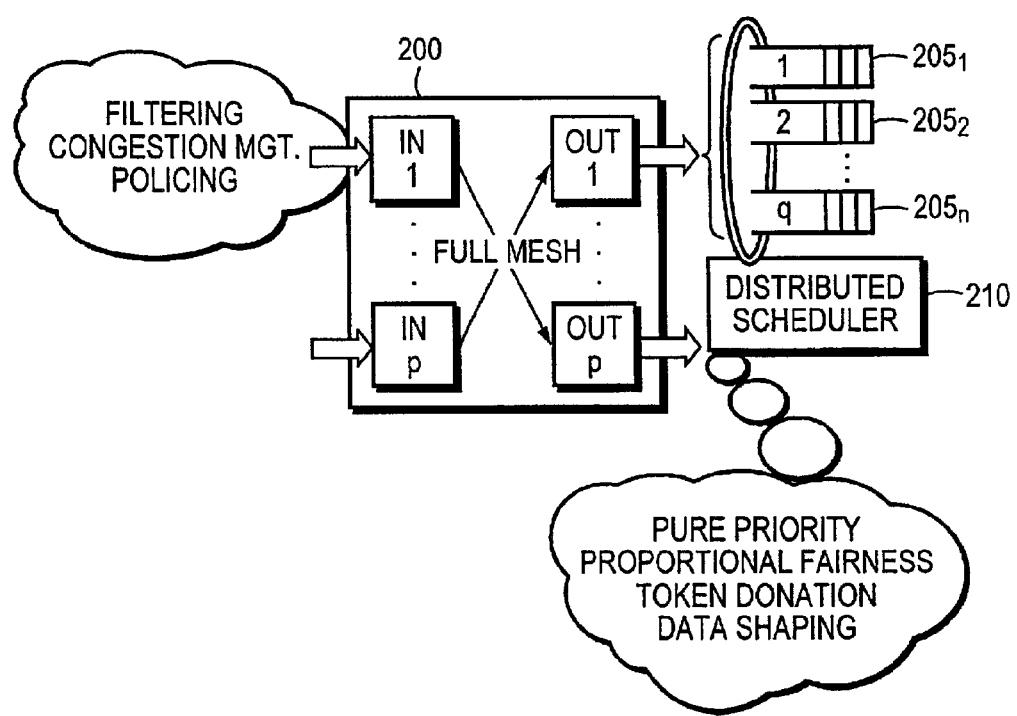
FIG. 2A schematically illustrates a prior-art, full-mesh interconnect system implementing output queuing.
Figure 2B:
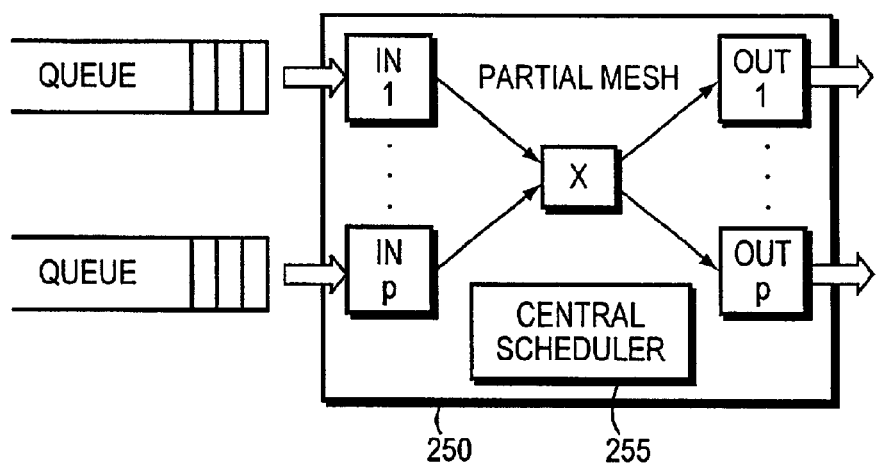
FIG. 2B schematically illustrates a prior-art, partial-mesh interconnect system exhibiting head-of-line blocking.
Figure 2C:
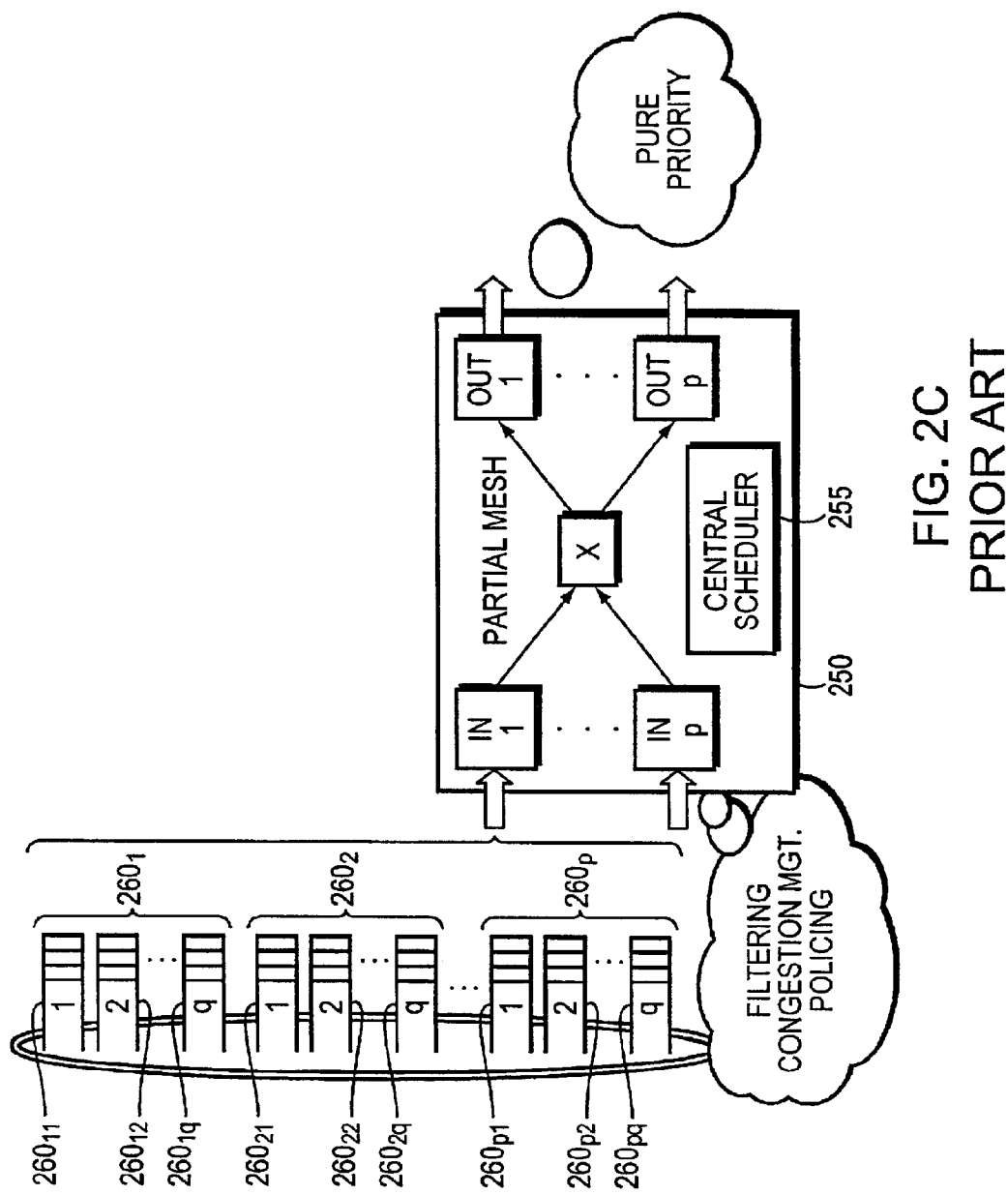
FIG. 2C schematically illustrates a prior-art, partial-mesh interconnect system implementing virtual output queuing.
Figure 3B:
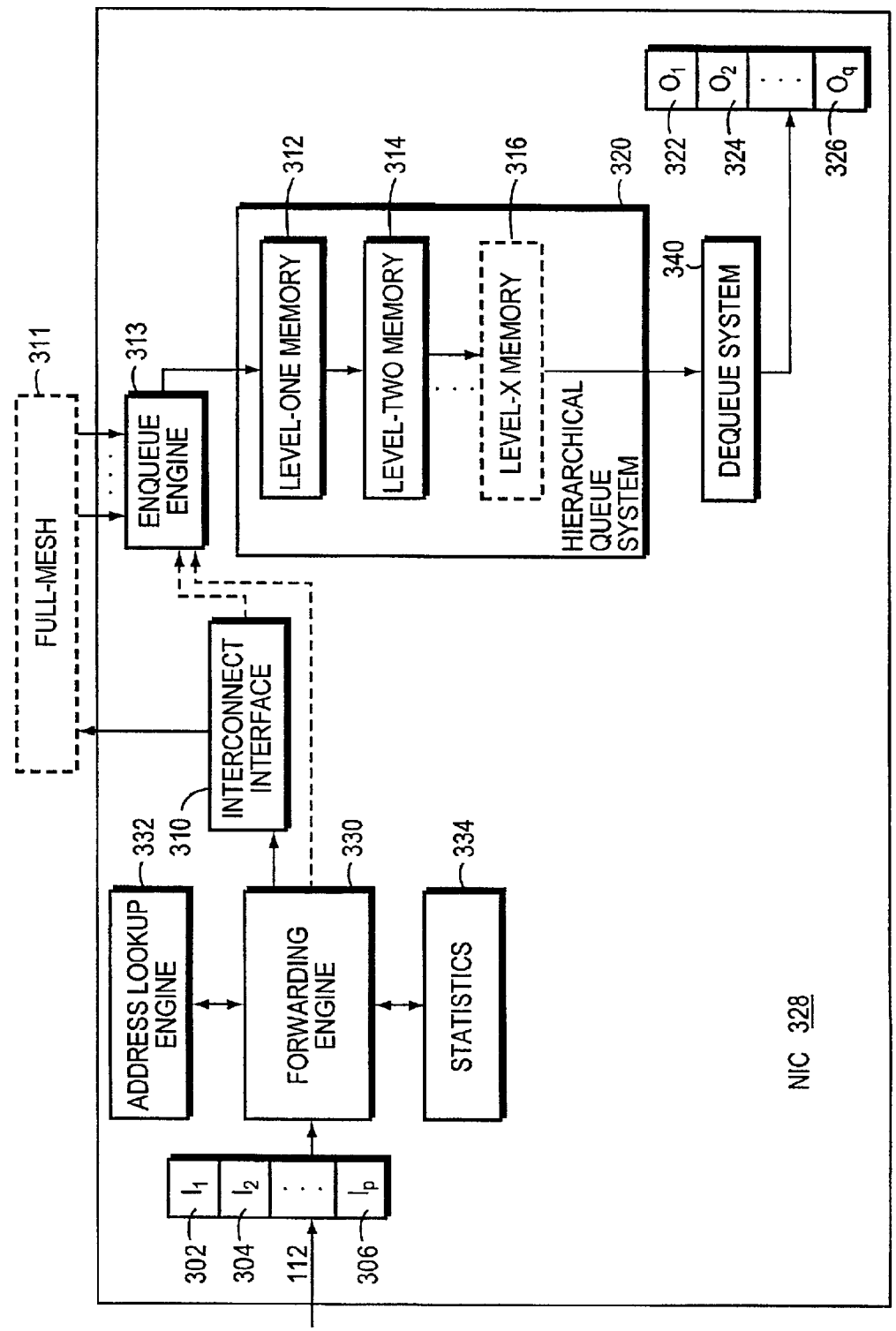
FIG. 3B schematically illustrates several components in a network interface card that are arranged and operated in accordance with the present invention.
Figure 4:
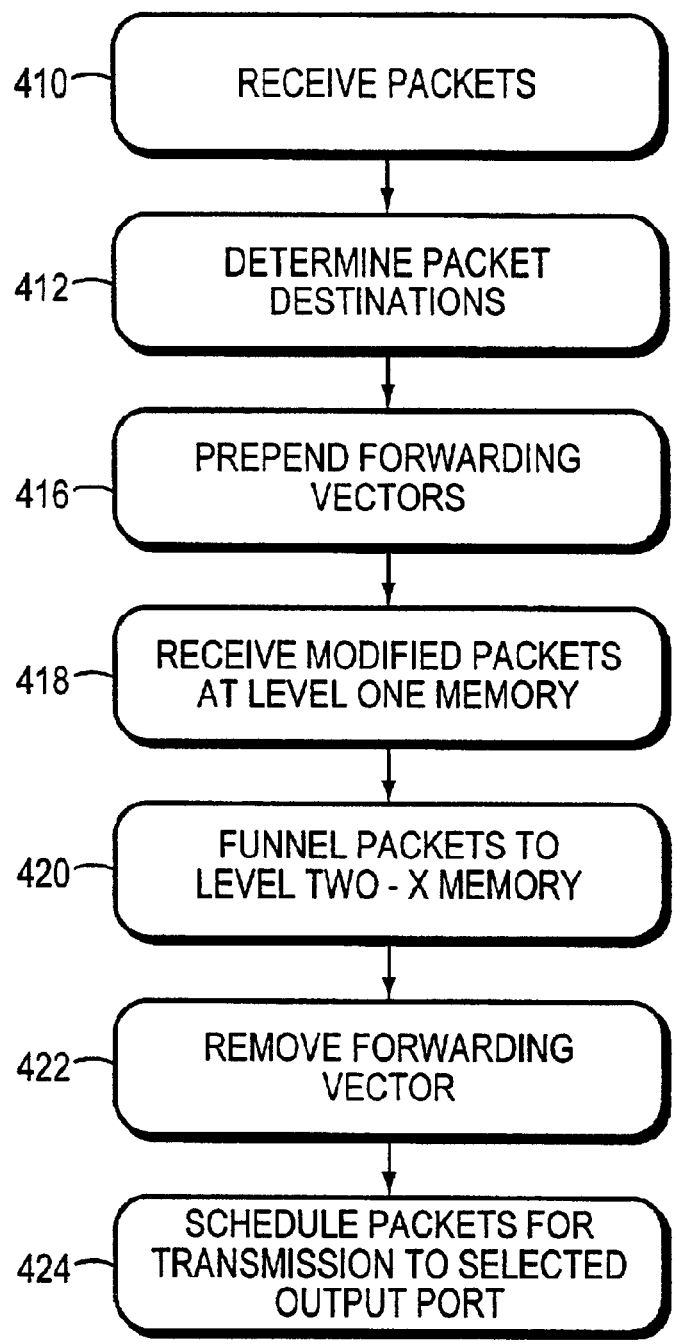
FIG. 4 provides a flow diagram of the steps performed when operating the network interface card of FIG. 3B, in accordance with one embodiment of the present invention.

With reference to FIGS. 3B and 4, a network interface card (NIC) 328 embodying aspects of the present invention includes input ports 302, 304, 306, a packet processing or forwarding engine 330, an address lookup engine (ALE) 332, a statistics module 334, an interconnect interface 310 (FIG. 2A), the hierarchical queue system 320, a dequeue system 340, and output ports 322, 324, 326. The NIC 328 receives packets from the packet-based communication network 110 (FIG. 1) at input ports 302, 304, 306 (step 410). The forwarding engine 330, together with the ALE 332, determine the destination output ports of the packets by looking up the appropriate output ports 322, 324, 326 associated with that destination (step 412), and prepending forwarding vectors onto the packets (step 416) to aid in routing them to the appropriate output ports.

The modified packets are then routed to the full-mesh interconnect 311 via the interconnect interface 310 (as shown in greater detail in FIG. 2A) and are subsequently delivered to the hierarchical queue system 320. The hierarchical queue system 320 of the NIC 328 normally receives the modified packets via the full-mesh interconnect 311 so that it can funnel packets originally received at the input ports 162, 164, 166, 224, 226, 228 of any NIC installed within the communication device 150, including the packets received by the input ports 302, 304, 306 of its own NIC 328, to one or more of the output ports 322, 324, 326 of its own NIC 328. In another embodiment, packets received at input ports 302, 304, 306 are transferred directly to the hierarchical queue system 320 by the forwarding engine 330 and bypass the interconnect interface 310 and full-mesh interconnect 311 altogether. In yet another embodiment, the forwarding engine 330 transfers the packets to the interconnect interface 310, which then directly forwards the packets to the hierarchical queue system 320, thus bypassing the full-mesh interconnect 311.

Regardless of the physical path followed, the modified packets are received at a first-level memory 312 of the hierarchical queue system (step 418). The packets in the first-level memory 312 are funneled to a second-level memory 314 and to subsequent X-level memories 316 (step 420) corresponding to memory elements organized into increasingly deeper queue depths as described below. The funneling/buffering process implemented in the hierarchical queue system 320 groups the packets in the lowest level of memory of the hierarchical queue system 320 into queues associated with particular output ports 322, 324, 326. Packets are then transferred to the dequeue system 340 where the forwarding vectors of each packet are removed (step 422) and the packets are scheduled for transmission to the selected output ports 322, 324, 326 (step 424). The packets are then transmitted from the selected output ports 322, 324, 326 to a communication network such as the LAN 120, MAN 130, or WAN 140.

More particularly and as an illustrative embodiment, when a packet is received at input port 302, a forwarding engine 330 associated with the input port 302 is selected. The selected forwarding engine parses the received packet header.

The forwarding engine 330 processes the packet header by checking the integrity of the packet header, verifying its checksum, accessing a statistics module 334 to provide statistics that are used to report the processing activity involving this packet header to modules external to the selected forwarding engine, and communicating with the ALE 332 to obtain routing information for one of the output ports 322, 324, 326 associated with the destination of the packet. Additional network specific (e.g., IP, ATM, Frame Relay, HDLC, TDM) packet processing may be done at this time. At the conclusion of the forwarding engine activity, the selected forwarding engine can modify the packet header to include routing information (e.g., by prepending a forwarding vector to the packet header) that designates a particular output port of the NIC 328. The modified packet header is then written to a buffer of the forwarding engine 330 where it is subsequently routed to the hierarchical queue system 320 as discussed above.

Figure 5:
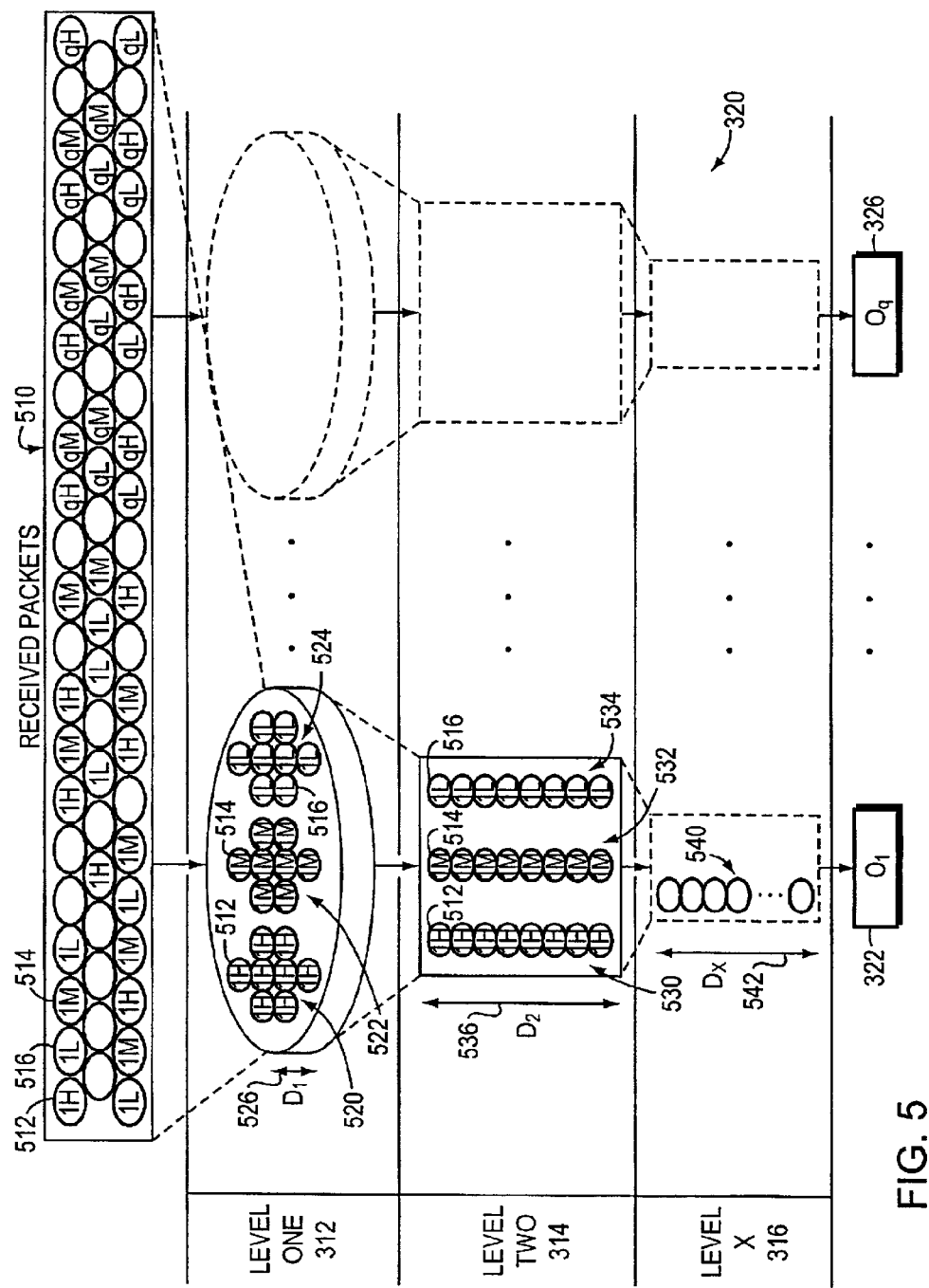
FIG. 5 illustrates the memory, packet, and queue structure of the hierarchical queue system of the network interface card of FIG. 3B, in accordance with one embodiment of the present invention.
Figure 6:
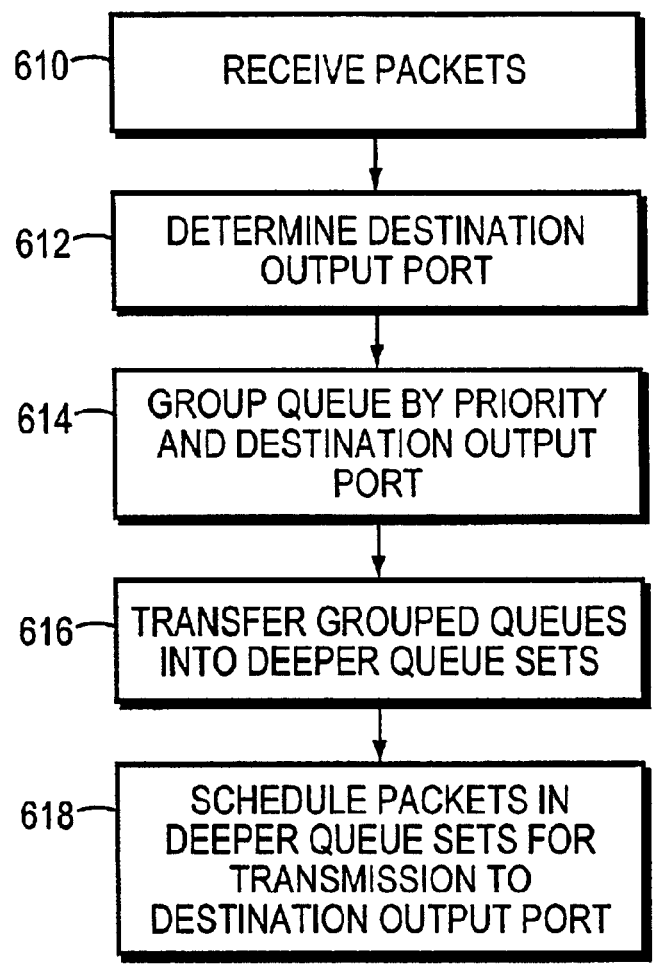
FIG. 6 provides a flow diagram of the steps performed by the dequeue and hierarchical queue system of FIG. 5, in accordance with one embodiment of the present invention.

Focusing now on the hierarchical queue system 320 and with reference to FIGS. 5 and 6, the modified packets 510, which are received at the first-level memory or first packet buffer 312 (step 610), comprise a plurality of packets having varying priority levels and designated for various output ports (i.e., physical or virtual ports) of the NIC 328. For example, the received packets 510 may include a plurality of high-priority packets 512, medium-priority packets 514, and low-priority packets 516, some of which are destined for output port 322 and others for one of the other output ports 326. The present invention examines the forwarding vectors and the packet header information in the received packets 510 to determine their destination output port 322 (step 612). In one embodiment, the received packets 510 for a particular output port 322 are organized into groups of queues or priority queue sets (step 614) that correspond, for example, to a high-priority queue set 520 (including high-priority packets 512), a medium-priority queue set 522 (including medium-priority packets 514), and a low-priority queue set 524 (including low-priority packets 516).

The packets in the first-series priority queue sets 520, 522, 524 of the first packet buffer 312 are then funneled into second-series priority queue sets 530, 532, 534 in the second level memory or second packet buffer 314 (step 616). The second-series queue sets 530, 532, 534 are associated with the same output port 322 as the first-series priority queue sets 520, 522, 524. The second-series queue sets 530, 532, 534 comprise second-series queues that have a greater buffer depth 536 than the corresponding first-series queues in the first-series queue sets so as to provide deeper buffering at a slower operating rate (and thus enable the use of less expensive memory as the second packet buffer 314). In this context, the term "buffer depth" refers to the maximum amount of packet data that can be stored in a particular queue.

It is important to note that the first packet buffer 312 operates at the aggregate network rate of the communication device 150 and therefore supports a relatively high-speed memory access rate. Further, a sum of the first packet-buffer bandwidths of all of the first packet buffers in the NIC 328 is at least as large as the aggregate network bandwidth of the communication device 150. This means that the first packet-buffer 312 is able to receive packet data in the amount and rate that such data is provided by the communication network 110. In order to support these operating parameters while remaining non-blocking and output buffered, the first packet buffer 312 uses a wide data bus (to achieve high data rates) and a multiple bank architecture (to achieve high frame rates). The first packet buffer 312 is also relatively shallow (e.g., tens of thousands of packets of storage) so that the first packet-buffer depth 526 of the first-series queues is not very deep. As stated above, the second-series queues have a greater packet-buffer depth 536 (e.g., millions of packets of storage). The second packet-buffer depth is often ten times to one hundred times or more than the depth of the first packet-buffer depth. In general, a sum of the second packet-buffer bandwidths of all the second packet buffers can exceed the sum of the first packet-buffer bandwidths of all the first packet buffers. In other words, the packet-handling capabilities of the second packet buffers (considered in total) are equal to, and may in fact be greater than, the capabilities of the first packet buffers. However, individual second packet-buffer bandwidths are typically less than the aggregate bandwidth of the first packet-buffer bandwidths.

The easing of these performance restrictions as the packets are funneled into deeper queues in the hierarchical queue system 340 enables the use of different memory types for the first and second packet buffers and can thus result in significant cost savings without material performance degradation. Alternatively, the first and second packet buffers can be organized within the same pool of memory and exhibit the same performance characteristics (with just a difference in their buffer depths), but this implementation is not as cost effective. In one embodiment, the hierarchical queue system 320 incorporates more than two levels of packet buffering, such as a level-X memory 316. Similarly, the level-X memory 316 would provide a packet-buffer depth 542 that exceeds the depth 536 of the corresponding second packet buffer. Once the received packets 510 have been funneled down to the lowest level of memory (with the deepest buffer depth), a plurality of dequeuing systems 340, associated with the queues in the packet buffers, schedule the packets for transmission to the destination output port 322 (step 618).

More particularly and as an illustrative embodiment, the first packet buffer 312 receives packets in parallel from all of the NICS 160, 180, 328 of the communication device 150 via the full-mesh interconnect 311. Enqueue engines 313 (FIG. 3B) parse the forwarding vectors to determine whether the received packets are destined for this NIC 328. If the packets are destined for an output port 322, 326 of the NIC 328, the enqueue engines further determine the priority level for the received packets 510 and determine which of the queues (with a consistent priority level) in each memory level of the hierarchical queue system 320 will buffer the received packet. The received packets 510 are then sorted by output port and priority level and grouped into first-series queues in the first packet buffer 312. The packets in the first-series queues are then transferred to corresponding second-series queues in the second packet buffer 314. Enqueue engines again parse the forwarding vectors of the transferred packets to determine particular queues within the second-series priority queue sets that will receive the transferred packets. In one embodiment, there is a one-for-one mapping of queue sets between the first and second packet buffers 312, 314 respectively. The second packet buffer 314 provides the bulk of the packet buffering of the hierarchical queue system 320 and funnels the packets to the destination output ports 322, 326 using conventional bandwidth shaping and packet scheduling processes to guarantee service level agreements. Random Early Detection (RED) and weighted RED (wRED) algorithms can be used at the ingress of the second packet buffer 314 to manage queue congestion. An example of the port and queue assignments of the hierarchical queue system 320 is provided in Table 1, below.

TABLE 1

Packet-buffering System Port & Queue Assignments

| Packet-buffering System Queues | 0:127 | | | |
|---|---|---|---|---|
| Level:1 Queues | 0:31 | 32:63 | 64:95 | 96:127 |
| Level:2 Queues | Level:2-0 0:31 | Level:2-1 0:31 | Level:2-2 0:31 | Level:2-3 0:31 |
| Port | 0:3 | 4:7 | 8:11 | 12:15 |

The funneling effect of reduced memory bandwidth requirements for the level-two and level-X memories 314, 316 facilitates the implementation of a richer set of QoS mechanisms. For example, the distributed scheduler 210 can donate bandwidth from idle high-priority queues to busy lower-priority queues that have packets to transmit. The higher-priority queues are generally configured to guarantee transmission and are not normally designed to be over-subscribed. The reverse may also be done (i.e., donating bandwidth from idle low-priority queues to higher-priority queues). In addition, other QoS techniques may be used such as combining pure priority scheduling with Weighted Fair Queuing and bandwidth donation.

Figure 7:
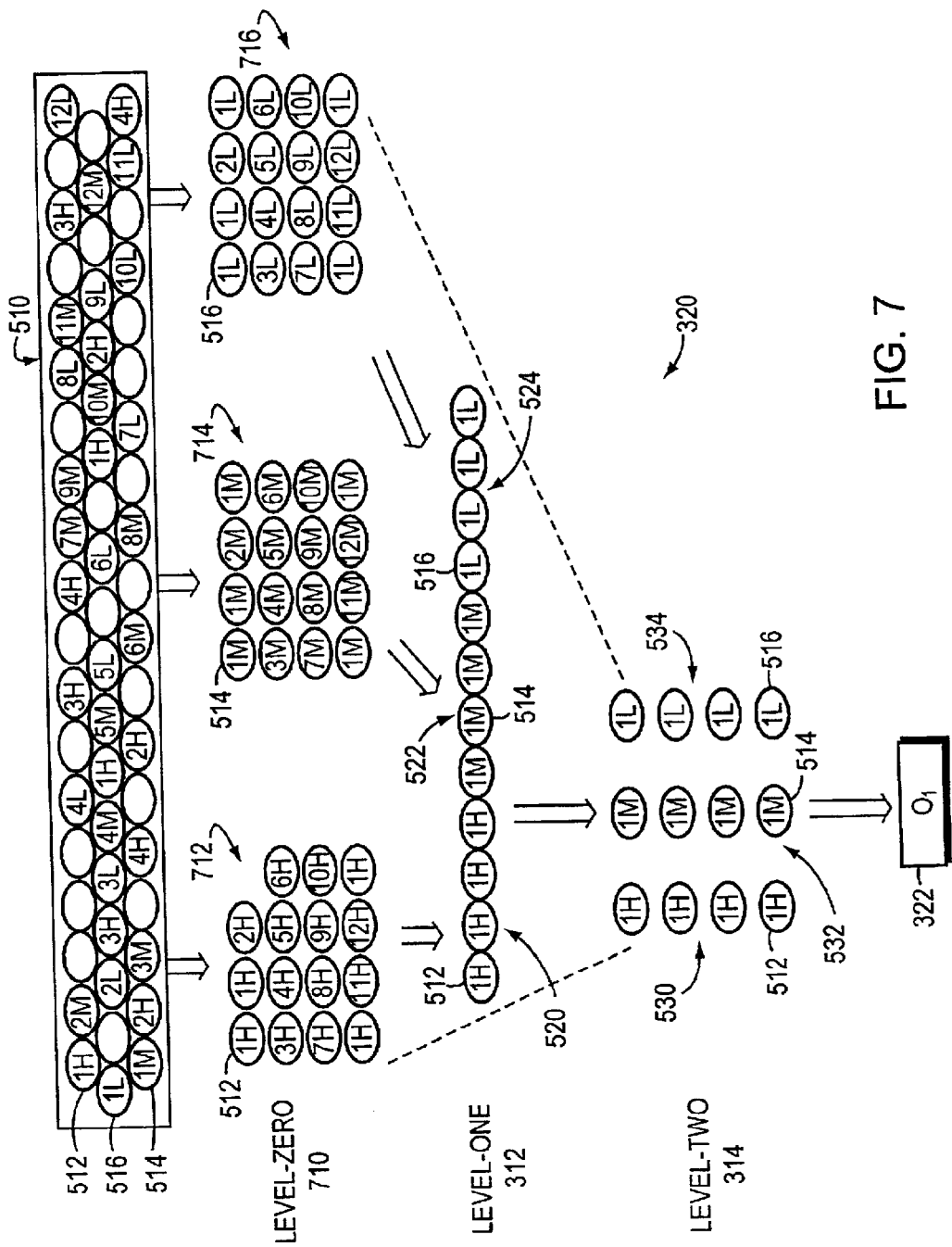
FIG. 7 illustrates the memory, packet, and queue structure of the hierarchical queue system of FIG. 5 when aggregating and buffering queue flows, in accordance with one embodiment of the present invention.

With reference to FIG. 7, the hierarchical queue system 320 can also be used to aggregate packets into queue flows with common forwarding attributes, such as the same QoS or directed at the same communication device. The aggregation of like traffic reduces the burden of managing the large number of queues that can be formed in the lower levels of the hierarchical queue system 320. In other words, as the number of ports in the communication device 150 increase, the resulting number of queues in the hierarchical queue system 320 expands and thus adds to the overall buffering and scheduling complexity in the NIC 328. By presorting the packets received by the communication device 150 into queue flows having the same QoS, the sorting burden on the first-level memory 710 is alleviated, because the first-level memory 710 need only sort through the prioritized queue flows to locate packets destined for the output port 322 associated with the first-level memory 710 rather than sort by both priority level and output port In one embodiment, the packets 510 received from the communication network 110 reflect a variety of priority levels and are targeted at a plurality of different output ports. A level-zero memory 710 sorts the received packets 510 by priority level into priority queue sets 712, 714, 716 irrespective of their destination output ports. A subset of the packets in the level-zero memory 710 that correspond to a particular output port 322 of the NIC 328 are then transferred to the first-level memory 710, which organizes the packet data into priority queue sets 520, 522, 524 (also associated with port 322) as previously described.

The hierarchical queue system of the present invention has been described in the context of a full-mesh configuration, however, those skilled in the art will recognize that the benefits of the present invention can be realized in other configuration types. In one illustrative embodiment and with reference to FIG. 8, a communication device 810 includes a plurality of instances 820', 820'', 820''' of the hierarchical queue system of the present invention. The plurality of instances 820', 820'', 820''' are interconnected by a full-mesh interconnect 830. The communication device 810 receives packets from a full-mesh or partial-mesh interconnect 850. Incoming packets enter a level-zero memory 840 and are prioritized/sorted by an enqueue engine 842. The prioritized packets are routed to one of the plurality of instances of the hierarchical queue system 820', 820", 820'" that is associated with a particular destination outport port (not shown) of the communication device 810 for which the packets are destined.

If the packets received by the level-zero memory 840 are destined for an output port (not shown) associated with one of a plurality of instances 860', 860", 860'" of a hierarchical queue system in another communication device 870, the level-zero memory 840 will route the packets to a level-zero memory 880 of the communication device 870 via the full-mesh or partial-mesh interconnect 850. The packets will then be prioritized/sorted by enqueue engine 882 and routed to the appropriate hierarchical queue system instance 860', 860", 860'" via the full-mesh interconnect 890.

Figure 8:
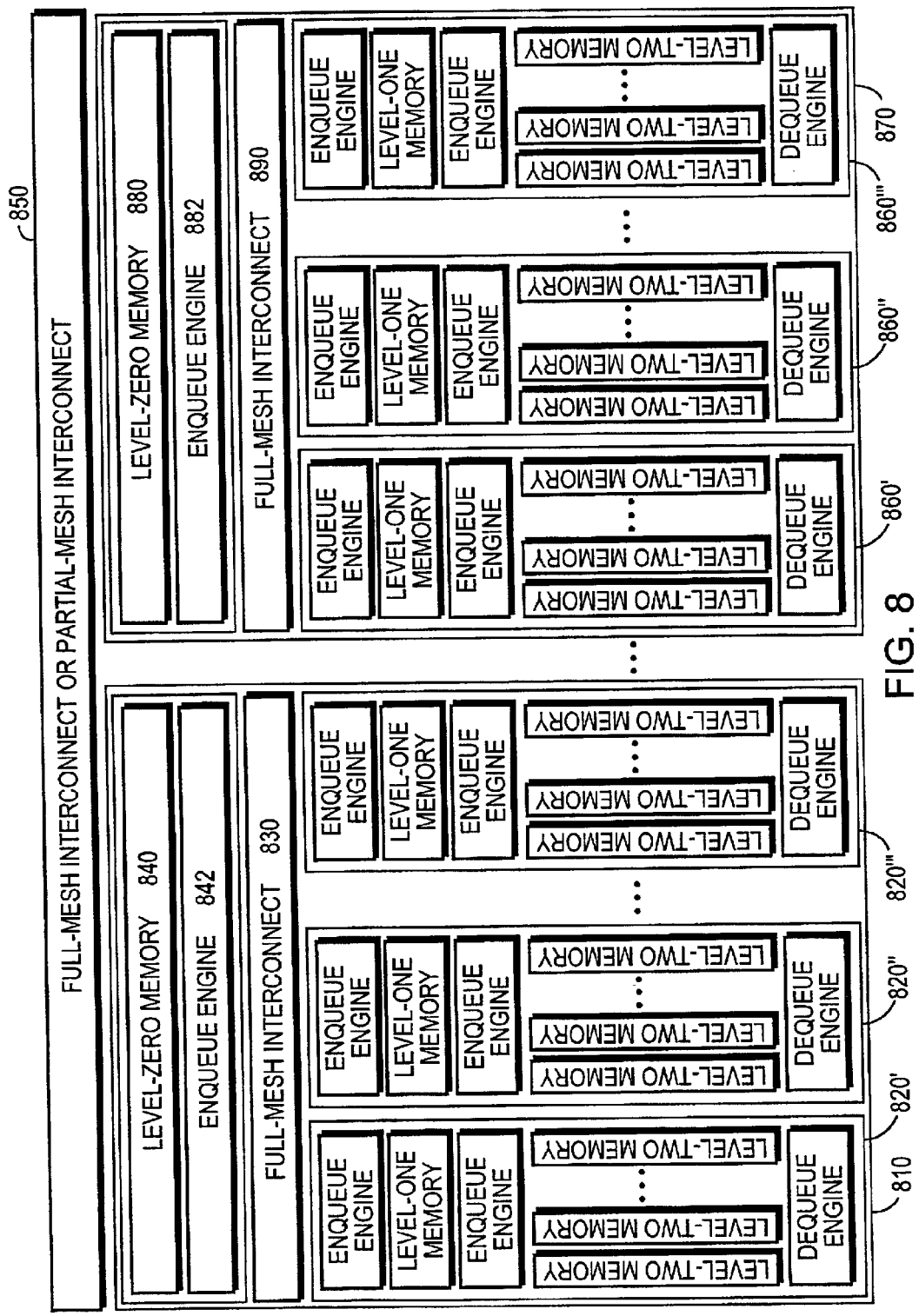
FIG. 8 illustrates an embodiment of the hierarchical queue system in a partial-mesh interconnected system.

The interconnection of the level-zero memory 840, 850 via a partial-mesh interconnect is useful, for example, if the technology limits of the day (i.e., aggregate interconnect speed and level-zero aggregate memory bandwidth) cannot keep up with the aggregate bandwidth of all of the input ports of the system. By contrast, if the technology limits can keep up with the aggregate bandwidth of the input ports of the system, then a full-mesh interconnect could be implemented as shown in FIG. 8.

Although the present invention has been described with reference to specific details, it is not intended that such details should be regarded as limitations upon the scope of the invention, except as and to the extent that they are included in the accompanying claims.

What is claimed is:

1. A packet-buffering system in a communication device for transferring packets received over a communications network from an input port to an output port of the communication device, the system comprising:

a first-level memory segmented into a plurality of first-level queues each having a first-buffer depth, the plurality of first-level queues receiving the packets from the input port of the communication device; and a second-level memory in communication with the first-level memory and the output port, the second-level memory being segmented into a plurality of second-level queues each having a second-buffer depth and being associated with the output port of the communication device, the plurality of second-level queues receiving packet data from at least one of the plurality of first-level queues and transferring the packet data to the output port, wherein a sum of the second-buffer depths exceeds a sum of the first-buffer depths.

2. The packet-buffering system of claim 1, wherein the plurality of first-level queues each have a first-buffer bandwidth and the plurality of second-level queues each have a second-buffer bandwidth, wherein a sum of the second-buffer bandwidths is equal to or greater than a sum of the first-buffer bandwidths.

3. The packet-buffering system of claim 2, wherein the sum of the first-buffer bandwidths is not less than an aggregate bandwidth of the communications network.

4. The packet-buffering system of claim 1, wherein the first and second-level memories are implemented in a fully connected mesh architecture having a plurality of input ports and a plurality of output ports, each input port being continuously connected to a corresponding output port.

5. The packet-buffering system of claim 1, wherein the first and second-level memories are implemented in a partially connected mesh architecture having a plurality of input ports and a plurality of output ports, at least one of the input ports being switchably connected to at least one of the output ports.

6. The packet-buffering system of claim 1, wherein the received packets have priority levels associated therewith, each of the plurality of second-level queues being assigned a priority level and receiving packets having a priority level consistent therewith.

7. The packet-buffering system of claim 6, further comprising a scheduler in communication with the plurality of second-level queues, the scheduler donating bandwidth from one of the plurality of second-level queues with a first priority level to another of the plurality of second-level queues with a second priority level, wherein the first priority level is higher than the second priority level.

8. The packet-buffering system of claim 6, further comprising a scheduler in communication with the plurality of second-level queues, the scheduler donating bandwidth from one of the plurality of second-level queues with a first priority level to another of the plurality of second-level queues with a second priority level, wherein the first priority level is lower than the second priority level.

9. The packet-buffering system of claim 1, further comprising a scheduler in communication with the plurality of second-level queues, the scheduler independently scheduling packets received by the plurality of second-level queues on a pure priority basis.

10. The packet-buffering system of claim 1, further comprising a scheduler in communication with the plurality of second-level queues, the scheduler independently scheduling packets received by the plurality of second-level queues using a weighted fair queuing technique.

11. The packet-buffering system of claim 1, further comprising a scheduler in communication with the plurality of second-level queues, the scheduler independently scheduling packets received by the plurality of second-level queues using a random early detection technique.

12. The packet-buffering system of claim 1, further comprising a scheduler in communication with the plurality of second-level queues, the scheduler independently scheduling packets received by the plurality of second-level queues using a weighted random early detection technique.

13. The packet-buffering system of claim 1, further comprising a scheduler in communication with the plurality of second-level queues, the scheduler independently scheduling packets received by the plurality of second-level queues using a bandwidth donation technique.

14. The packet-buffering system of claim 1, further comprising a scheduler in communication with the plurality of second-level queues, the scheduler independently scheduling packets received by the plurality of second-level queues by using a combination of techniques selected from pure priority, weighted fair queuing, random early detection, weighted random early detection, and bandwidth donation.

15. The packet-buffering system of claim 1, wherein the first-level memory is composed of a first memory type and the second-level memory is composed of a second memory type, the second memory type having performance characteristics substantially similar to the first memory type.

16. The packet-buffering system of claim 1, wherein the first-level memory is composed of a first memory type and the second-level memory is composed of a second memory type, the second memory type having performance characteristics substantially different from that of the first memory type.

17. A hierarchical packet-buffering system in a communication device for connection to a network having a first network bandwidth, the system comprising:
   a first packet buffer capable of receiving data packets from the communication device over the network, the first packet buffer comprising a plurality of queues and having a first packet-buffer bandwidth and a first packet-buffer depth; and
   a plurality of second packet buffers in communication with the first packet buffer, each of the plurality of second packet buffers being associated with and receiving packets from at least one of the plurality of queues of the first packet buffer, each of the plurality of second packet buffers having a second packet-buffer bandwidth and a second packet-buffer depth,
   wherein
      i) a sum of the second packet-buffer depths exceeds the first packet-buffer depth,
      ii) a sum of the second packet-buffer bandwidths is equal to or greater than the first packet-buffer bandwidth, and
      iii) the first packet-buffer bandwidth is greater than or equal to the first network bandwidth.

18. The hierarchical packet-buffering system of claim 17, wherein the communication device is one of a plurality of communication devices interconnected to provide direct connections between each of the plurality of communication devices, wherein the hierarchical packet-buffering system contained in each of the plurality of communication devices is not shared by the plurality of communication devices.

19. The hierarchical packet-buffering system of claim 17, wherein the first packet buffer comprises a packet buffer embedded in an ASIC.

20. The hierarchical packet-buffering system of claim 17, wherein each of the plurality of second packet buffers comprises field configurable memory elements.

21. The hierarchical packet-buffering system of claim 17, further comprising a plurality of third packet buffers in communication with at least one of the plurality of second packet buffers, each of the plurality of third packet buffers being associated with and receiving packets from the at least one of the plurality of queues from the at least one of the plurality of second packet buffers, each of the plurality of third packet buffers having a third packet-buffer bandwidth and a third packet-buffer depth, wherein a sum of the third packet-buffer bandwidths associated with the at least one of the plurality of queues of the at least one second packet buffer is equal to or greater than the at least one second packet-buffer bandwidth, and wherein a sum of the third packet-buffer depths associated with the at least one of the plurality of queues of the at least one second packet buffer exceeds the second packet-buffer depth of the at least one second packet buffer.

22. The hierarchical packet-buffering system of claim 17, wherein the first packet buffer is composed of a first memory type and the second packet buffers are composed of a second memory type, the second memory type having performance characteristics substantially similar to the first memory type.

23. The hierarchical packet-buffering system of claim 17, wherein the first packet buffer is composed of a first memory type and the second packet buffers are composed of a second memory type, the second memory type having performance characteristics substantially different from that of the first memory type.

24. The hierarchical packet-buffering system of claim 17, wherein the first and second packet buffers are implemented in a fully connected mesh architecture having a plurality of input ports and a plurality of output ports, each input port being continuously connected to a corresponding output port.

25. The hierarchical packet-buffering system of claim 17, wherein the first and second packet buffers are implemented in a partially connected mesh architecture having a plurality of input ports and a plurality of output ports, at least one of the input ports being switchably connected to at least one of the output ports.

26. The hierarchical packet-buffering system of claim 17, wherein the data packets received by the first packet buffer have priority levels associated therewith, each of the plurality of second packet buffers being assigned a priority level and receiving packets having a priority level consistent therewith.

27. The hierarchical packet-buffering system of claim 26, further comprising
   a scheduler in communication with the plurality of second packet buffers, the scheduler donating bandwidth from one of the plurality of second packet buffers with a first priority level to another of the plurality of second packet buffers with a second priority level, wherein the first priority level is higher than the second priority level.

28. The hierarchical packet-buffering system of claim 26, further comprising
   a scheduler in communication with the plurality of second packet buffers, the scheduler donating bandwidth from one of the plurality of second packet buffers with a first priority level to another of the plurality of second packet buffers with a second priority level, wherein the first priority level is lower than the second priority level.

29. The hierarchical packet-buffering system of claim 17, further comprising
   a scheduler in communication with the plurality of second packet buffers, the scheduler independently scheduling packets received by the plurality of second packet buffers on a pure priority basis.

30. The hierarchical packet-buffering system of claim 17, further comprising
   a scheduler in communication with the plurality of second packet buffers, the scheduler independently scheduling packets received by the plurality of second packet buffers using a weighted fair queuing technique.

31. The hierarchical packet-buffering system of claim 17, further comprising
   a scheduler in communication with the plurality of second packet buffers, the scheduler independently scheduling packets received by the plurality of second packet buffers using a random early detection technique.

32. The hierarchical packet-buffering system of claim 17, further comprising
   a scheduler in communication with the plurality of second packet buffers, the scheduler independently scheduling packets received by the plurality of second packet buffers using a weighted random early detection technique.

33. The packet-buffering system of claim 17, further comprising a scheduler in communication with the plurality of second packet buffers, the scheduler independently scheduling packets received by the plurality of second packet buffers using a bandwidth donation technique.

34. The packet-buffering system of claim 17, further comprising
a scheduler in communication with the plurality of second packet buffers, the scheduler independently scheduling packets received by the plurality of second packet buffers by using a combination of techniques selected from pure priority, weighted fair queuing, random early detection, weighted random early detection, and bandwidth donation.

35. A hierarchical packet-buffering system for transferring packets from a series of input ports to a series of output ports, at least some of the input ports being continuously connected to corresponding output ports, the system comprising:
a first packet buffer organized into a first series of queues comprising a plurality of priority queue sets, each first-series priority queue set comprising a plurality of the first-series queues and being associated with one of the output ports, each of the first-series queues having a first-series queue size;
a second packet buffer receiving packets from the first packet buffer, the second packet buffer being organized into a second series of queues comprising a plurality of priority queue sets, each second-series priority queue set comprising a plurality of the second-series queues and being associated with one of the output ports, each of the second-series queues having a second-series queue size larger than the size of a corresponding first-series queue;
a plurality of de-queuing systems, each of the de-queuing systems being assigned to one of the second-series queues and scheduling packets stored therein for output on one of the output ports; and
a forwarding engine for examining each of the packets received on the input ports and enabling transfer of each the packet to a selected one of the first-series queues,
wherein
packets arrive at the input ports and are transferred to the first-series queues at an aggregate network rate, and packets being received by the second-series queues are transferred at a rate less than the aggregate network rate.

36. The hierarchical packet-buffering system of claim 35, wherein the first-series queues each have a first-buffer bandwidth and the second-series queues each have a second-buffer bandwidth, wherein a sum of the second-buffer bandwidths is equal to or greater than a sum of the first-buffer bandwidths.

37. The hierarchical packet-buffering system of claim 36, wherein the sum of the first-buffer bandwidths is not less than an aggregate bandwidth of a communications network coupled to the input ports.

38. The hierarchical packet-buffering system of claim 35, wherein the first and second packet buffers are implemented in a fully connected mesh architecture.

39. The hierarchical packet-buffering system of claim 35, wherein the first and second packet buffers are implemented in a partially connected mesh architecture.

40. The hierarchical packet-buffering system of claim 35, wherein the transferred packets each have associated priority levels, the associated priority levels corresponding to at least one of the plurality of first-series priority queue sets and to at least one of the plurality of second-series priority queue sets.

41. The hierarchical packet-buffering system of claim 40, further comprising
a scheduler in communication with the plurality of second-series priority queue sets, the scheduler donating bandwidth from one of the plurality of second-series priority queue sets with a first priority level to another of the plurality of second-series priority queue sets with a second priority level, wherein the first priority level is higher than the second priority level.

42. The hierarchical packet-buffering system of claim 40, further comprising
a scheduler in communication with the plurality of second-series priority queue sets, the scheduler donating bandwidth from one of the plurality of second-series priority queue sets with a first priority level to another of the plurality of second-series priority queue sets with a second priority level, wherein the first priority level is lower than the second priority level.

43. The hierarchical packet-buffering system of claim 35, further comprising
a scheduler in communication with the plurality of second-series priority queue sets, the scheduler independently scheduling packets received by the plurality of second-series priority queue sets on a pure priority basis.

44. The hierarchical packet-buffering system of claim 35, further comprising
a scheduler in communication with the plurality of second-series priority queue sets, the scheduler independently scheduling packets received by the plurality of second-series priority queue sets using a weighted fair queuing technique.

45. The hierarchical packet-buffering system of claim 35, further comprising
a scheduler in communication with the plurality of second-series priority queue sets, the scheduler independently scheduling packets received by the plurality of second-series priority queue sets using a random early detection technique.

46. The hierarchical packet-buffering system of claim 35, further comprising
a scheduler in communication with the plurality of second-series priority queue sets, the scheduler independently scheduling packets received by the plurality of second-series priority queue sets using a weighted random early detection technique.

47. The packet-buffering system of claim 35, further comprising
a scheduler in communication with the plurality of second-series priority queue sets, the scheduler independently scheduling packets received by the plurality of second-series priority queue sets using a bandwidth donation technique.

48. The packet-buffering system of claim 35, further comprising
a scheduler in communication with the plurality of second-series priority queue sets, the scheduler independently scheduling packets received by the plurality of second-series priority queue sets by using a combination of techniques selected from pure priority, weighted fair queuing, random early detection, weighted random early detection, and bandwidth donation.

49. A method of buffering packets in a communication device, the method comprising the steps of:
- receiving the packets at an input port of the communication device;
- providing first-level queues associated with the input port and having a first-buffer depth, the first-level queues receiving the packets from the input port;
- selecting an output port of the communication device as a destination for the received packets;
- providing second-level queues associated with the selected output port and corresponding to the first-level queues, the second-level queues having a second-buffer depth exceeding the first-buffer depth of the first-level queues;
- transferring the received packets from the first-level queues to corresponding second-level queues; and
- transmitting the transferred packets in the second-level queues to the selected output port.

50. The method of claim 49, further comprising the steps of:
- determining a priority level associated with the received packets;
- assigning the priority level to at least one of the second-level queues; and
- transferring the received packets from the first-level queues to the at least one of the second-level queues assigned to that priority level.

51. The method of claim 50, further comprising the step of donating bandwidth from one of the second-level queues with a first priority level to another of the second-level queues with a second priority level, wherein the first priority level is higher than the second priority level.

52. The method of claim 50, further comprising the step of donating bandwidth from one of the second-level queues with a first priority level to another of the second-level queues with a second priority level, wherein the first priority level is lower than the second priority level.

53. The method of claim 49 further comprising the step of independently scheduling packets received by the second-level queues on a pure priority basis.

54. The method of claim 49 further comprising the step of independently scheduling packets received by the second-level queues using a weighted fair queuing technique.

55. The method of claim 49 further comprising the step of independently scheduling packets received by the second-level queues using a random early detection technique.

56. The method of claim 49 further comprising the step of independently scheduling packets received by the second-level queues using a weighted random early detection technique.

57. The method of claim 49 further comprising the step of independently scheduling packets received by the second-level queues using a bandwidth donation technique.

58. The method of claim 49 further comprising the step of independently scheduling packets received by the second-level queues using a combination of techniques selected from pure priority, weighted fair queuing, random early detection, weighted random early detection, and bandwidth donation.

59. The method of claim 49, wherein
i) the step of providing first-level queues further comprises receiving the packets at an aggregate network rate of the communication device, and
ii) the transferring step comprises buffering the transferred packets in the second-level queues at a rate less than the aggregate network rate.

60. The method of claim 49, wherein the received packets have forwarding attributes associated therewith, and further comprising the steps of:
- aggregating the received packets with substantially similar forwarding attributes into queue flows; and
- routing the queue flows into the first-level queues.

61. The method of claim 49 farther comprising the step of continuously coupling the input port to the selected output port.

62. The method of claim 49 further comprising the step of switchably coupling the input port to the selected output port.

63. The method of claim 49 further comprising the steps of:
- providing a first memory element having a first set of performance characteristics;
- forming the first-level queues within the first memory element;
- providing a second memory element having a second set of performance characteristics, the second set of performance characteristics being substantially similar to the first set of performance characteristics; and
- forming the second-level queues within the second memory element.

64. The method of claim 49 further comprising the steps of:
- providing a first memory element having a first set of performance characteristics;
- forming the first-level queues within the first memory element;
- providing a second memory element having a second set of performance characteristics, the second set of performance characteristics differing from the first set of performance characteristics; and
- forming the second-level queues within the second memory element.

65. A method of buffering data in a packet-buffering system of a communication device for connection to a network having a first network bandwidth, the method comprising the steps of:
- providing a first packet buffer capable of receiving data packets from the communication device over the network, the first packet buffer comprising a plurality of queues and having a first packet-buffer bandwidth and a first packet-buffer depth;
- providing a plurality of second packet buffers in communication with the first packet buffer, each of the second packet buffers being associated with and receiving packets from at least one of the plurality of queues of the first packet buffer, each of the second packet buffers having a second packet-buffer bandwidth and a second packet-buffer depth, wherein
  i) a sum of the second packet-buffer depths exceeds the first packet-buffer depth,
  ii) a sum of the second packet-buffer bandwidths is equal to or greater than the first packet-buffer bandwidth, and
  iii) the first packet-buffer bandwidth is greater than or equal to the first network bandwidth;
- receiving the data packets in at least one of the plurality of queues of the first packet buffer, the data packets being received from an input port of the communication device; and
- routing packets from the queues of the first packet buffer to corresponding queues of second packet buffer, the corresponding queues transferring the routed packets to an output port of the communication device.

66. The method of claim 65, further comprising the steps of:
    determining a priority level associated with the data packets received from the input port;
    assigning the priority level to at least one of the second packet buffers; and
    routing the received packets from the first-level queues to the at least one of the second packet buffers assigned to that priority level.

67. The method of claim 65, further comprising the step of donating bandwidth from one of the second packet buffers with a first priority level to another of the second-level queues with a second priority level, wherein the first priority level is higher than the second priority level.

68. The method of claim 65, further comprising the step of donating bandwidth from one of the second packet buffers with a first priority level to another of the second packet buffers with a second priority level, wherein the first priority level is lower than the second priority level.

69. The method of claim 65 further comprising the step of independently scheduling packets received by the second packet buffers on a pure priority basis.

70. The method of claim 65 further comprising the step of independently scheduling packets received by the second packet buffers using a weighted fair queuing technique.

71. The method of claim 65 further comprising the step of independently scheduling packets received by the second packet buffers using a random early detection technique.

72. The method of claim 65 further comprising the step of independently scheduling packets received by the second packet buffers using a weighted random early detection technique.

73. The method of claim 65 further comprising the step of independently scheduling packets received by the second packet buffers using a bandwidth donation technique.

74. The method of claim 65 further comprising the step of independently scheduling packets received by the second packet buffers using a combination of techniques selected from pure priority, weighted fair queuing, random early detection, weighted random early detection, and bandwidth donation.

75. The method of claim 65, further comprising the steps of:
    receiving the data packets at an aggregate network rate of the communication device by the queues of the first packet buffer; and
    buffering the packets received from the first packet buffer by the second packet buffers at a rate less than the aggregate network rate.

76. The method of claim 65 further comprising the steps of:
    aggregating the packets received at the input port according to substantially similar forwarding attributes associated therewith, the aggregated packets forming queue flows; and
    routing the queue flows into the plurality of queues of the first packet buffer.

77. The method of claim 65 further comprising the step of continuously coupling the input port to the output port.

78. The method of claim 65 further comprising the step of switchably coupling the input port to the output port.

79. The method of claim 65 further comprising the steps of:
    providing a first memory element having a first set of performance characteristics;
    forming the first packet buffer within the first memory element;
    providing a second memory element having a second set of performance characteristics, the second set of performance characteristics being substantially similar to the first set of performance characteristics; and
    forming the second packet buffers within the second memory element.

80. The method of claim 65 further comprising the steps of:
    providing a first memory element having a first set of performance characteristics;
    forming the first packet buffer within the first memory element;
    providing a second memory element having a second set of performance characteristics, the second set of performance characteristics differing from the first set of performance characteristics; and
    forming the second packet buffers within the second memory element.

81. A method of buffering queues in a hierarchical packet-buffering system coupled to a network, comprising the steps of:
    receiving data packets over the network, the data packets having forwarding attributes associated therewith;
    aggregating data packets with substantially similar forwarding attributes into queue flows;
    routing at least one of the queue flows into a plurality of first packet buffers, each of the plurality of first packet buffers having a first packet-buffer bandwidth and first packet-buffer depth;
    routing a subset of the at least one of the queue flows from at least one of the plurality of first packet buffers into a plurality of second packet buffers associated with the at least one of the queue flows, each of the plurality of second packet buffers having a second packet-buffer bandwidth and a second packet-buffer depth, wherein a sum of the first packet-buffer bandwidths associated with the at least one of the queue flows is less than or equal to a corresponding sum of the associated second packet-buffer bandwidths.

82. A method of transferring packets from a series of input ports to a series of output ports, each of the input ports being continuously connected to all of the output ports, the method comprising the steps of:
    providing a first packet buffer organized into a first series of queues comprising a plurality of priority queue sets, each first-series priority queue set comprising a plurality of the first-series queues and being associated with one of the output ports and a priority level, each of the first-series queues having a first-series queue size;
    providing a second packet buffer organized into a second series of queues comprising a plurality of priority queue sets, each second-series priority queue set comprising a plurality of the second-series queues and being associated with one of the output ports and a priority level, each of the second-series queues having a second-series queue size larger than the size of the corresponding first-series queue;
    receiving packets at the input ports at an aggregate network rate, the received packets having forwarding attributes associated therewith;
    examining, at the aggregate network rate, each of the received packets and assigning a priority and an output port thereto;

transferring, at the aggregate network rate and in accordance with the assigned priority level, packets from each of the input ports to one of the first-series priority queues of the first-series queue set associated with the assigned output port;

transferring, at a rate less than the aggregate network rate, packets from the first-series queues to corresponding ones of the second-series queues, packets being transferred from the first-series queues to the second-series queues in an order according with their priority levels; and scheduling packets stored in the second-series queues for transmission at the assigned output port.

83. The method of claim 82, further comprising the steps of:

determining a priority level associated with the packets received at the input ports; and assigning the priority level to at least one of the second-series queue sets.

84. The method of claim 83 further comprising the step of donating bandwidth from one of the plurality of second-series priority queue sets with a first priority level to another of the plurality of second-series priority queue sets with a second priority level, wherein the first priority level is higher than the second priority level.

85. The method of claim 83 further comprising the step of donating bandwidth from one of the plurality of second-series priority queue sets with a first priority level to another of the plurality of second-series priority queue sets with a second priority level, wherein the first priority level is lower than the second priority level.

86. The method of claim 82 further comprising the step of independently scheduling packets received by the plurality of second-series priority queue sets on a pure priority basis.

87. The method of claim 82 further comprising the step of independently scheduling packets received by the plurality of second-series priority queue sets using a weighted fair queuing technique.

88. The method of claim 82 further comprising the step of independently scheduling packets received by the plurality of second-series priority queue sets using a random early detection technique.

89. The method of claim 82 further comprising the step of independently scheduling packets received by the plurality of second-series priority queue sets using a weighted random early detection technique.

90. The method of claim 82 further comprising the step of independently scheduling packets received by the plurality of second-series priority queue sets using a bandwidth donation technique.

91. The method of claim 82 further comprising the step of independently scheduling packets received by the plurality of second-series priority queue sets using a combination of techniques selected from pure priority, weighted fair queuing, random early detection, weighted random early detection, and bandwidth donation.

92. The method of claim 82, further comprising the steps of:

aggregating the received packets with substantially similar forwarding attributes into queue flows; and routing the queue flows into the first-series priority queues.

* * * * *